(12) United States Patent
Care et al.

(10) Patent No.: US 9,677,570 B2
(45) Date of Patent: Jun. 13, 2017

(54) GAS TURBINE ENGINE

(71) Applicant: ROLLS-ROYCE PLC, London (GB)

(72) Inventors: Ian Colin Deuchar Care, Derby (GB); Cedric Brett Harper, Derby (GB)

(73) Assignee: ROLLS-ROYCE plc, London (GB)

( * ) Notice: Subject to any disclaimer, the term of this patent is extended or adjusted under 35 U.S.C. 154(b) by 344 days.

(21) Appl. No.: 14/523,336

(22) Filed: Oct. 24, 2014

(65) Prior Publication Data
US 2015/0147156 A1    May 28, 2015

(30) Foreign Application Priority Data

Nov. 22, 2013   (GB) .................................. 1320611.5

(51) Int. Cl.
| | |
|---|---|
| *F04D 19/00* | (2006.01) |
| *F04D 29/52* | (2006.01) |
| *F01D 21/04* | (2006.01) |
| *F01D 25/24* | (2006.01) |
| *F02C 7/05* | (2006.01) |

(52) U.S. Cl.
CPC ......... *F04D 29/526* (2013.01); *F01D 21/045* (2013.01); *F01D 25/24* (2013.01); *F02C 7/05* (2013.01); *F04D 19/002* (2013.01); *F05D 2220/36* (2013.01); *Y02T 50/671* (2013.01)

(58) Field of Classification Search
CPC .......... F01D 21/045; F01D 25/24; F02C 7/05; F04D 19/002; F04D 29/526; F05D 2220/36; Y02T 50/671
See application file for complete search history.

(56) References Cited

U.S. PATENT DOCUMENTS 4,149,824 A * 4/1979 Adamson .............. F01D 21/006
                                                   415/197
5,456,576 A   10/1995 Lyon
(Continued)

FOREIGN PATENT DOCUMENTS

| EP | 2305984 A2 | 4/2011 |
|---|---|---|
| EP | 2 620 652 A1 | 7/2013 |
| EP | 2495400 A3 | 3/2015 |

OTHER PUBLICATIONS

Jul. 9, 2014 Search Report issued in British Application No. 1320611.5.
(Continued)

*Primary Examiner* — Igor Kershteyn
(74) *Attorney, Agent, or Firm* — Oliff PLC

(57) ABSTRACT

A fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element. The fan containment system further includes an annular fan track liner comprising a plurality of adjacent arcuate fan track liner panels. Each of the plurality of fan track liner panels is connected to the fan case at the hook via one or more fasteners configured to permit movement of the fan track liner panel relative to the hook such that the fan track liner panel can pivot towards the annular casing element when a released fan blade impacts the fan track liner panel.

17 Claims, 6 Drawing Sheets

(56) References Cited

U.S. PATENT DOCUMENTS

| | | | |
|---|---|---|---|
| 2005/0089391 A1* | 4/2005 | Stretton | F01D 21/045 415/9 |
| 2011/0044806 A1 | 2/2011 | Harper | |
| 2011/0232833 A1* | 9/2011 | Collins | F01D 11/127 156/165 |
| 2012/0224949 A1* | 9/2012 | Harper | F01D 21/045 415/9 |
| 2013/0051998 A1 | 2/2013 | O'Toole et al. | |

OTHER PUBLICATIONS

Mar. 26, 2015 European Search Report issued in European Patent Application No. EP 14 19 0217.

* cited by examiner

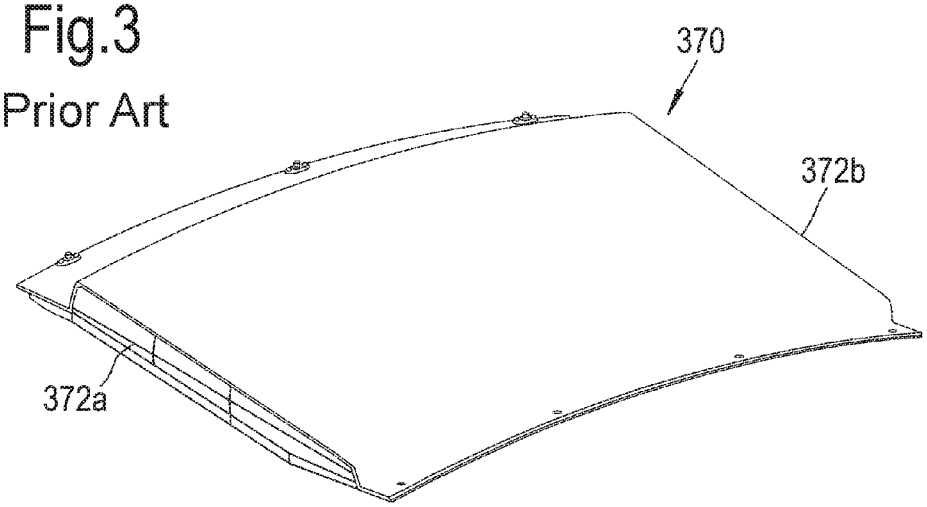
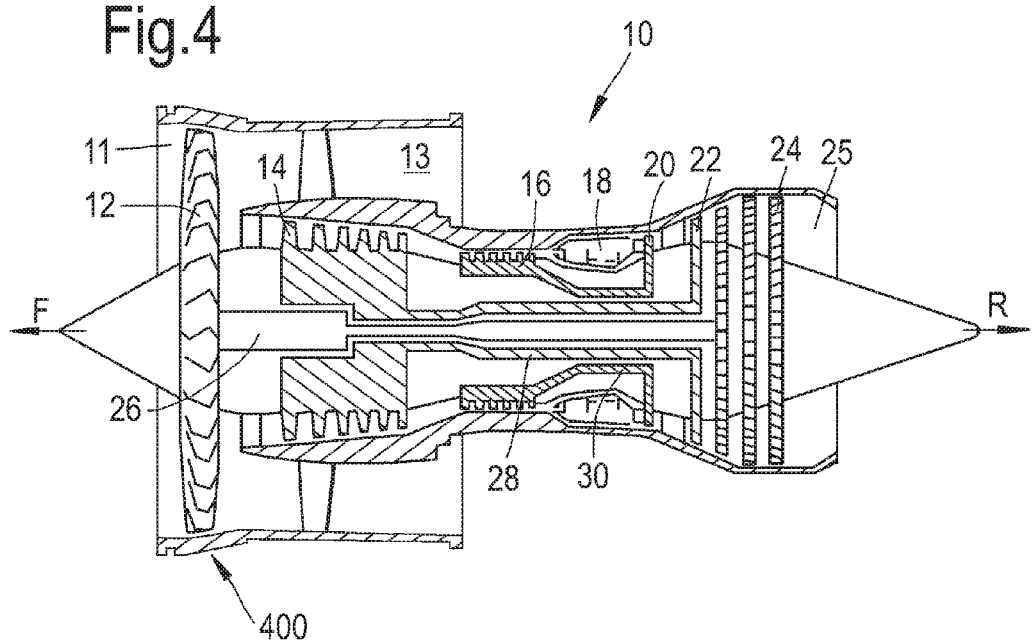

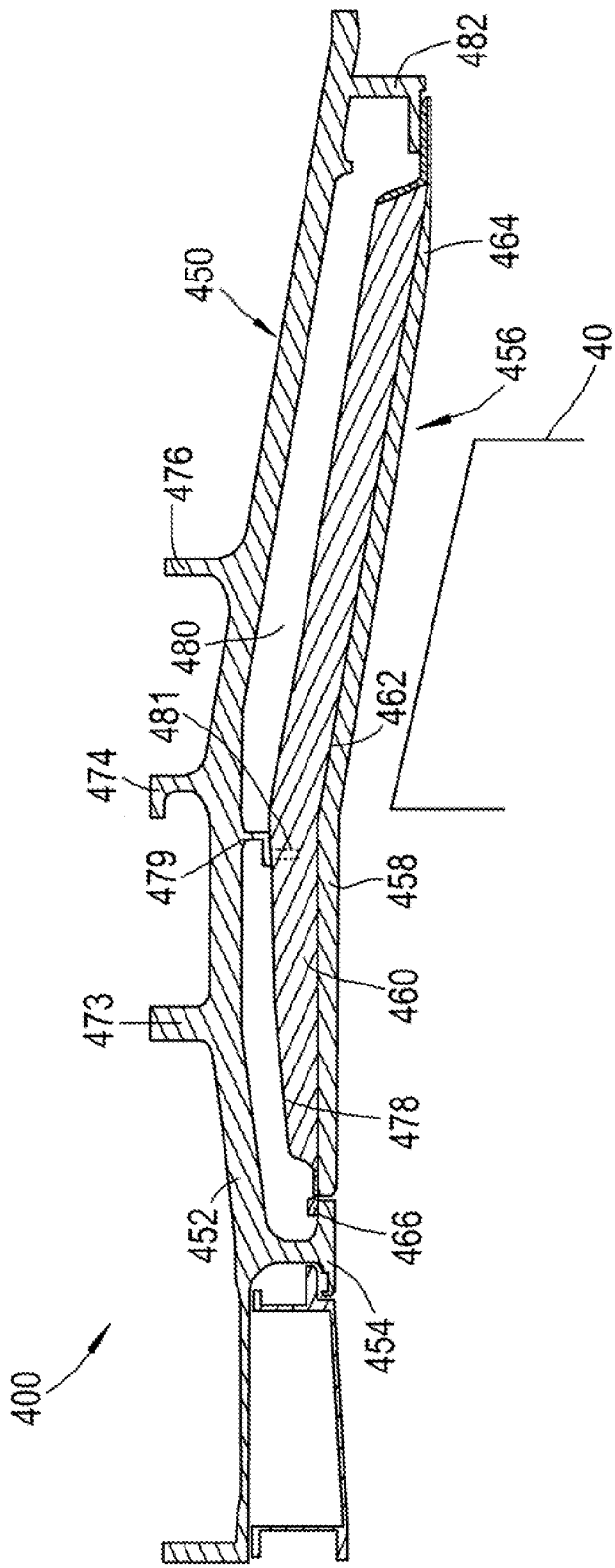

GAS TURBINE ENGINE

FIELD OF INVENTION

The present invention relates to a fan containment system, a casing assembly, a fan and/or a gas turbine engine.

BACKGROUND

Turbofan gas turbine engines (which may be referred to simply as 'turbofans') are typically employed to power aircraft. Turbofans are particularly useful on commercial aircraft where fuel consumption is a primary concern. Typically a turbofan gas turbine engine will comprise an axial fan driven by an engine core. The engine core is generally made up of one or more turbines which drive respective compressors via coaxial shafts. The fan is usually driven directly off an additional lower pressure turbine in the engine core.

The fan comprises an array of radially extending fan blades mounted on a rotor and will usually provide, in current high bypass gas turbine engines, around seventy-five percent of the overall thrust generated by the gas turbine engine. The remaining portion of air from the fan is ingested by the engine core and is further compressed, combusted, accelerated and exhausted through a nozzle. The engine core exhaust mixes with the remaining portion of relatively high-volume, low-velocity air bypassing the engine core through a bypass duct.

To satisfy regulatory requirements, such engines are required to demonstrate that if part or all of a fan blade were to become detached from the remainder of the fan, that the detached parts are suitably captured within the engine containment system.

The fan is radially surrounded by a fan casing. It is known to provide the fan casing with a fan track liner and a containment system designed to contain any released blades or associated debris. Often, the fan track liner can form part of the fan containment system.

The fan track liner typically includes an annular layer of abradable material which surrounds the fan blades. During operation of the engine, the fan blades rotate freely within the fan track liner. At their maximum extension of movement and/or creep, or during an extreme event, the blades may cut a path into this abradable layer creating a seal against the fan casing and minimising air leakage around the blade tips.

An operational requirement of the fan track liner is that it is resistant to ice impact loads. A rearward portion of the fan track liner is conventionally provided with an annular ice impact panel. This is typically a glass-reinforced plastic (GRP) moulding which may also be wrapped with GRP to increase its impact strength. Ice which forms on the fan blades is acted on by both centrifugal and airflow forces, which respectively cause it to move outwards and rearwards before being shed from the blades.

The geometry of a conventional fan blade is such that ice is shed from a trailing edge of the blade, strikes the ice impact panel, and is deflected without damaging the panel.

Swept fan blades are increasingly used in turbofan engines as they offer significant advantages in efficiency over conventional fan blades. Swept fan blades have a greater chord length at their central portion than conventional fan blades. This greater chord length means that ice that forms on a swept fan blade follows the same rearward and outward path as on a conventional fan blade but may reach a radially outer tip of the blade before it reaches the trailing edge. The ice will therefore be shed from the blade tip and may strike the fan track liner forward of the ice impact panel within the blade off zone (that is the region where a blade would contact the fan track liner in the event of a blade being detached from the fan).

A fan track liner used with a swept fan blade is therefore required to be strong enough to resist ice impact whilst allowing a detached fan blade to penetrate and be contained therewithin.

In recent years there has been a trend towards the use of lighter fan blades, which are typically either of hollow metal or of composite construction. These lighter fan blades have similar impact energy per unit area as an ice sheet, which makes it more difficult to devise a casing arrangement that will resist the passage of ice and yet not interfere with the trajectory of a released fan blade.

The fan casing is typically a plain or ribbed metallic casing, or a plain or isogrid Kevlar® (a para-aramid synthetic fibrous material from DuPont™) wrapped casing. In order to absorb the high energies generated following the detachment of a fan blade, the material(s) used to form the casing are selected for high strength and high ductility.

Early containment systems incorporated a steel band wrapped around the casing in the plane of the rotating fan blade. To reduce weight, a Kevlar® wrapped aluminium fan case was introduced. During fan blade off, the Kevlar® absorbs the blade energy by deflecting and stretching, to distribute the load around the casing, and in some designs of soft wall casing, the blade penetrates the case and is caught and contained by the Kevlar® wrap. Further alternative casing arrangements are available, including ribbed Armco® (a ferrous material from AK Steel International Ltd) or ribbed titanium, which are more usually used in hard wall designs where the blade is designed not to penetrate the case.

A conventional hard wall fan containment system or arrangement 100 is illustrated in FIG. 1 and surrounds a fan comprising an array of radially extending fan blades 40. Each fan blade 40 has a leading edge 44, a trailing edge 45 and fan blade tip 42. The fan containment arrangement 100 comprises a fan case 150. The fan case 150 has a generally frustoconical or cylindrical annular casing element 152 and a hook 154. The hook 154 is positioned axially forward of an array of radially extending fan blades 40. A fan track liner 156 is mechanically fixed or directly bonded to the fan case 150. The fan track liner 156 may be adhesively bonded to the fan case 150. The fan track liner 156 is provided as a structural filler to bridge a deliberate gap provided between the fan case 150 and the fan blade tip 42.

The fan track liner 156 has, in circumferential layers, an attrition liner 158 (also referred to as an abradable liner or an abradable layer), a filler layer which in this embodiment is a honeycomb layer 160, and a septum 162. The septum layer 162 acts as a bonding, separation, and load spreading layer between the attrition liner 158 and the honeycomb layer 160. The honeycomb layer 160 may be an aluminium honeycomb. The tips 42 of the fan blades 40 are intended to pass as close as possible to the attrition liner 158 when rotating. The attrition liner 158 is therefore designed to be abraded away by the fan blade tips 42 during abnormal operational movements of the fan blade 40 and to just touch during the extreme of normal operation to ensure the gap between the rotating fan blade tips 42 and the fan track liner 156 is as small as possible without wearing a trench in the attrition liner 158. During normal operations of the gas turbine engine, ordinary and expected movements of the fan blade 40 rotational envelope cause abrasion of the attrition liner 158. This allows the best possible seal between the fan blades 40 and the fan track liner 156 and so improves the effectiveness of the fan in driving air through the engine.

The purpose of the hook 154 is to ensure that, in the event that a fan blade 40 detaches from the rotor of the fan 12, the fan blade 40 will not be ejected through the front, or intake, of the gas turbine engine. During such a fan-blade-off event, the fan blade 40 travels tangentially to the curve of rotation defined by the attached fan blades. Impact with the containment system (including the fan track liner 156) of the fan case 150 prevents the fan blade 40 from travelling any further outside of the curve of rotation defined by the attached fan blades. The fan blade 40 will also move forwards in an axial direction, and the leading edge 44 of the fan blade 40 collides with the hook 154. Thus the fan blade 40 is held by the hook 154 and further axially forward movement is prevented. A trailing blade (not shown) then forces the held released blade rearwards where the released blade is contained. Thus the fan blade 40 is unable to cause damage to structures outside of the gas turbine engine casings.

As can be seen from FIG. 1, for the hook 154 to function effectively, a released fan blade 40 must penetrate the attrition liner 158 in order for its forward trajectory to intercept with the hook. If the attrition liner 158 is too hard then the released fan blade 40 may not sufficiently crush the fan track liner 156.

However, the fan track liner 156 must also be stiff enough to withstand the rigours of normal operation without sustaining damage. This means the fan track liner 156 must be strong enough to withstand ice and other foreign object impacts without exhibiting damage for example. Thus there is a design conflict, where on one hand the fan track liner 156 must be hard enough to remain undamaged during normal operation, for example when subjected to ice impacts, and on the other hand allow the tip 42 of the fan blade 40 to penetrate the attrition liner 158. It is a problem of balance in making the fan track liner 156 sufficiently hard enough to sustain foreign object impact, whilst at the same time, not be so hard as to alter the preferred hook-interception trajectory of a fan blade 40 released from the rotor. Ice that impacts the fan casing rearwards of the blade position is resisted by an ice impact panel 164.

An alternative fan containment system is indicated generally at 200 in FIG. 2. The fan containment system 200 includes a fan track liner 256 that is connected to the fan casing 250 at both an axially forward position and an axially rearward position. At the axially forward position, the fan track liner is connected to the casing at hook 254 via a sprung fastener 266. In the event of a fan blade detaching from the remainder of the fan, the fan blade impacts the fan track liner 256 and the fan track liner pivots about the rearward position of attachment to the casing (indicated at 268 in FIG. 2). Such an arrangement is often referred to as a trap door arrangement. The trap door arrangement has been found to help balance the requirements for stiffness of the fan track liner with the requirements for resistance of operational impacts (e.g. ice impacts) ensuring a detached blade is held within the engine.

The fan track liner may be formed of a plurality of arcuate panels positioned substantially coaxially so as to form a cylindrical or frustoconical fan track liner. A fan track liner panel of the prior art is indicated generally at 370 in FIG. 3. The fan track liner panel 370 includes straight edges 372a, 372b in the axial direction.

When the fan containment system has a trap door arrangement, the trajectory of a released fan blade or a released part of a fan blade (reference to a released fan blade from hereon in refers to both a released fan blade and a released part of a fan blade) can cross the boundary from one fan track liner panel to another. When a fan blade is released the trap door of a first fan track liner panel will be activated. However, the trap door of adjacent fan track liner panels will remain closed unless a sufficient force is applied to open them. This means that a step is present between the fan track liner panel where the trap door has been activated and the fan track liner panel where the trap door has not yet been activated. The step creates a barrier to a released fan blade, so there is a concern that the released fan blade may skip over the hook and avoid containment.

A contemplated solution to this problem is to adhesively bond adjacent panels together. However, the use of adhesive creates problems for both assembly and on-wing repair. An advantage of providing a fan track liner made from a plurality of panels is that liner damage can be quickly and effectively addressed whilst the engine is on-wing with minimum disruption. If an adhesive is used this advantage is reduced because of the need to remove adhesive from the panels and wait for adhesive to cure once repair work is complete.

SUMMARY OF INVENTION

The present invention seeks to address one or more of the problems associated with fan containment systems of gas turbine engines of the prior art.

A first aspect of the invention provides a fan containment system for fitment around an array of radially extending fan blades mounted on a hub in an axial gas turbine engine.

The fan containment system comprises a fan case having an annular casing element for encircling an array of fan blades and a hook projecting in a generally radially inward direction from the annular casing element. The fan containment system further includes an annular fan track liner comprising a plurality of adjacent arcuate fan track liner panels. Each of the plurality of fan track liner panels is connected to the fan case at the hook via one or more fasteners configured to permit movement of the fan track liner panel relative to the hook such that the fan track liner panel can pivot towards the annular casing element when a released fan blade impacts the fan track liner panel.

At least a portion of each fan track liner panel may be shaped so as to accommodate travel of a released fan blade having a trajectory that passes near a boundary between adjacent fan track liner panels.

Shaping at least a portion of the fan track liner panel to accommodate travel of a released fan blade advantageously reduces the number of fan blade off scenarios where a released fan blade needs to pivot one fan track liner panel towards the annular casing element (i.e. activate the trap door of the fan track liner panel) and also pivot an adjacent fan track liner panel towards the annular casing element, which mitigates the risk of a released fan blade or released part of a fan blade from avoiding capture by the fan containment system.

Further, the shape of the fan track liner panel can be selected to minimise vibration at natural resonances of the panels and for an ideal pressure profile.

The portion of the fan track liner panel that may be shaped may be a forward portion of the fan track liner panel proximal to the hook.

The fasteners may be spaced so as to break up the natural resonance of the fan track liner panels. For example, the circumferential spacing between fasteners may be varied around the circumference of the fan containment system.

At least a portion (e.g. a forward portion) of an edge (e.g. of a gas washed surface) of each fan track liner panel may be shaped to extend in an axially forward direction to a position circumferentially offset from an axially rearward position of the edge. The offset may be in a direction of rotation of fan blades around which, in use, the fan containment system is fitted.

At least a portion (e.g. a forward portion) of each fan track liner panel (e.g. axial edges of a gas washed surface of each fan track liner panel) may be angled and/or curved in a circumferential direction so as to accommodate travel of a released fan blade.

A rearward portion of the fan track liner panel may have axial edges that are angled at 0 to 15° in a circumferential direction to an axis parallel to a longitudinal axis of the fan containment system. For example, a rearward portion of the fan track liner panel has axial edges that are substantially parallel to a longitudinal axis of the fan containment system. Such an arrangement of fan track liner panel eases fitment of the fan track liner panels to the fan containment system.

A forward end of the fan track liner panel may be connected to the annular casing via the hook. A rearward end of the fan track liner panel may be supported or connected to the annular casing at a rearward support.

The fan track liner panel may be connected to the annular casing element at a position between the forward end and the rearward end of the fan track liner panel. For example, the fan track liner panel may be connected to the annular casing element via fasteners in the region between the forward end and the rearward end and/or at the rear support. The fasteners may be spaced so as to break up the natural resonance of the fan track liner panels. This mitigates the risk a passing blade forcing a natural vibration of a fan track liner panel in an operational running range of the fan. Further, spacing of the fasteners means that adjacent fan track liner panels can damp vibration of their neighbours.

The fan track liner panel may be connected to the annular casing element via fasteners in the region between the forward end and the rearward end, and at the rear support. The fasteners may be circumferentially out of phase. This further mitigates the risk a passing blade forcing a natural vibration of a fan track liner panel in an operational running range of the fan. The fasteners between the forward end and rearward end of the fan track liner panel and/or the fasteners at the rear support may also be out of phase with the fasteners at the hook.

A forward portion of the fan track liner panel may pivot substantially about the position of connection to the annular casing element between the forward and rearward end when a fan blade impacts the fan track liner panel. In such an embodiment, the rearward portion of the fan track liner panel may be substantially fixed with respect to the annular casing element. The rearward-most section of the fan track liner panel may form an ice impact panel.

The plurality of fan track liner panels may be connected to the annular casing element in a region between a forward end and rearward end of the fan track liner, and each fan track liner panel may be curved or angled from said position of connection to a position adjacent the hook.

Each fan track liner panel may be angled or curved from a mid-region of the fan track liner panel to a position adjacent the hook.

Adjacent sides of two or more of the plurality of adjacent panels may engage such that movement of one fan track liner panel towards the annular casing element applies a force to (and/or initiates movement of) an adjacent fan track liner panel towards the annular casing element.

The hook may be positioned axially forward of an array of fan blades when the fan containment system is fitted around said fan blades A second aspect of the invention provides a fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element. The containment system further comprises a fan track liner formed of a plurality of adjacent arcuate fan track liner panels positioned substantially coaxially so as to form an annular fan track liner. Each fan track liner panel is connected to the fan case at the hook via one or more fasteners configured to permit movement of the fan track liner panel relative to the hook such that the fan track liner panel can pivot towards the annular casing element when a released fan blade impacts the fan track liner panel. Adjacent sides of two or more of the plurality of adjacent panels engage such that movement of one fan track liner panel towards the annular casing element applies a force to (and/or initiates movement of) an adjacent fan track liner panel in a direction towards the annular casing element.

Applying an initial force to an adjacent fan track liner panel before impact of a released fan blade with the adjacent fan track liner panel means that a reduced force needs to be applied by the released fan blade to activate a trap door of the adjacent fan track liner panel (i.e. initiate pivoting of the fan track liner panel towards the annular casing element), which further increases the likelihood of the fan blade impacting the hook and being captured within the fan containment system.

At least portion of each of the adjacent sides may include a surface profiled in the radial direction.

At least a portion of one side of one panel may be seated on an adjacent side of an adjacent panel.

At least a portion of each of the adjacent sides may be curved or angled in a radial direction.

At least a portion of the sides of two or more of the fan track liner panels are substantially wedge shaped.

The adjacent sides of the fan track liner panels may be axial sides.

As will be apparent to the person skilled in the art, any of, or any combination of, the optional features of the fan containment system of the first aspect may be applied to the fan containment system of the second aspect.

A third aspect of the invention provides a fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element a. The fan containment system further comprises an annular fan track liner comprising a plurality of adjacent arcuate fan track liner panels. Each fan track liner panel is connected to the fan case so as to form a trap door arrangement, such that when a fan blade is released and impacts the fan track liner, the trap door is activated to guide said released fan blade towards the hook. At least a portion of the fan track liner panel is angled or curved in a circumferential direction so as to accommodate travel of a released fan blade.

As will be apparent to the person skilled in the art, any of, or any combination of, the optional features of the fan containment system of the first aspect may be applied to the fan containment system of the third aspect.

A fourth aspect of the invention provides a fan containment system for fitment around an array of radially extending fan blades mounted on a hub in an axial gas turbine engine. The fan containment system comprises a fan case having an annular casing element for encircling an array of fan blades and a hook projecting in a generally radially inward direction from the annular casing element. The fan containment system further comprises an annular fan track liner comprising a plurality of adjacent arcuate fan track liner panels. The fan track liner is connected to the fan case so as to form a trap door arrangement, such that when a fan blade is released and impacts the fan track liner, the trap door is activated to guide said released fan blade towards the hook. Adjacent sides of two or more of the plurality of adjacent fan track liner panels engage such that movement of one fan track liner panel towards the annular casing element applies a force to an adjacent fan track liner panel in a direction towards the annular casing element.

As will be apparent to the person skilled in the art, any of, or any combination of, the optional features of the fan containment system of the first aspect may be applied to the fan containment system of the fourth aspect.

A fifth aspect of the invention provides a fan casing comprising the fan containment system of the first, second, third or fourth aspect.

A sixth aspect of the invention provides a fan comprising the fan casing of the fifth aspect, and/or the fan containment system of the first, second, third or fourth aspect.

A seventh aspect of the invention provides a gas turbine engine comprising the fan of the sixth aspect, the fan casing of the fifth aspect, and/or the fan containment system of the first, second, third or fourth aspect

DESCRIPTION OF DRAWINGS

The invention will now be described, by way of example only, with reference to the accompanying drawings in which:

FIG. 3 is a perspective view from a non-gas-washed surface of a fan track liner panel of the prior art;

FIG. 4 is a cross-section through the rotational axis of a high-bypass gas turbine engine;

FIG. 5 is a partial cross-section through a fan blade containment system;

DETAILED DESCRIPTION

Figures 1, 2:
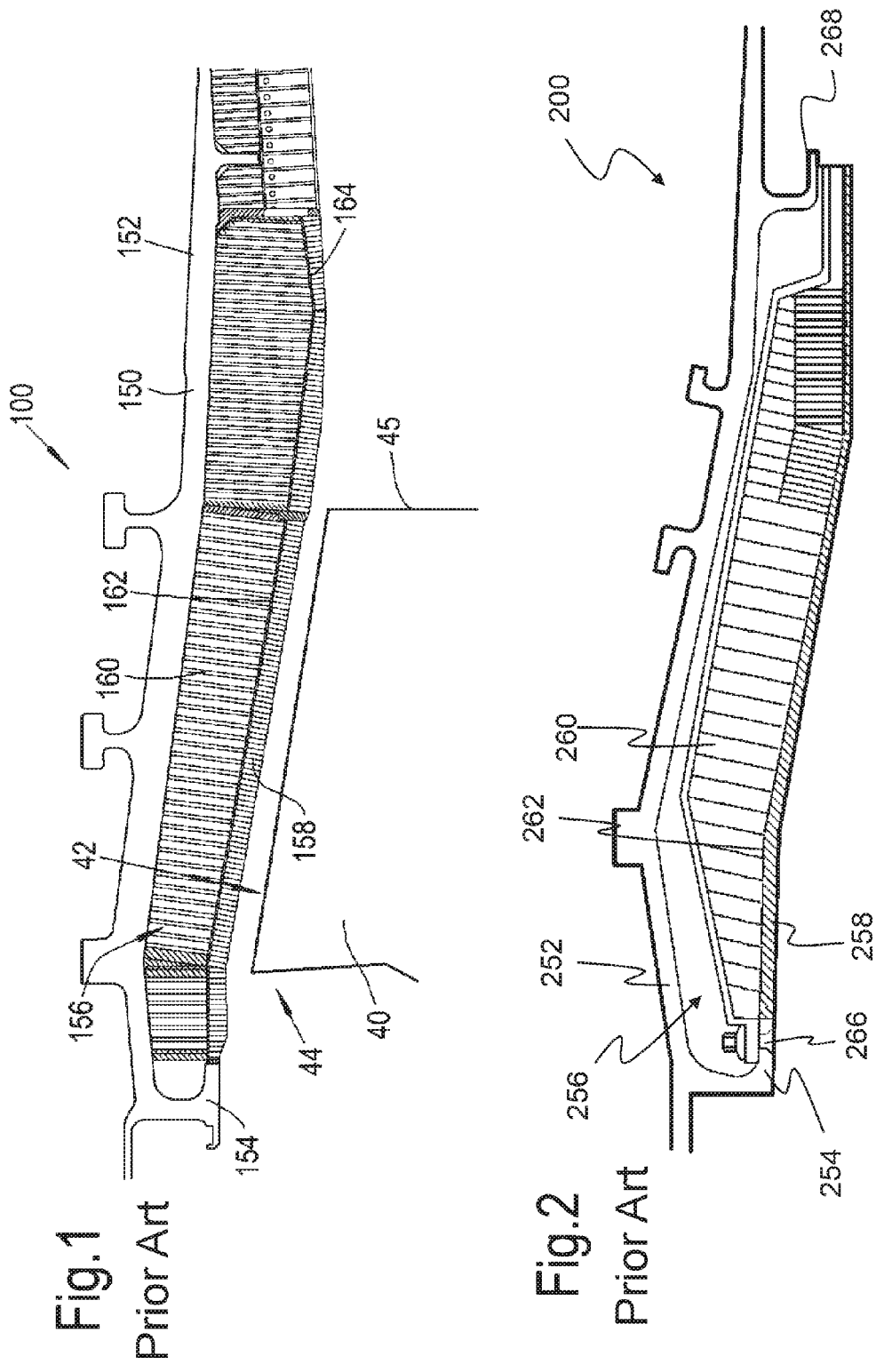
FIG. 1 is a partial view of a cross-section through a typical fan case arrangement of a gas turbine engine of the prior art.
FIG. 2 is a partial view of a cross-section through an alternative fan case arrangement of a gas turbine engine of the prior art.

With reference to FIG. 4 a bypass gas turbine engine is indicated at 10. The engine 10 comprises, in axial flow series, an air intake duct 11, fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 18, 20, 22 all rotate about the major axis of the gas turbine engine 10 and so define the axial direction of the gas turbine engine.

Air is drawn through the air intake duct 11 by the fan 12 where it is accelerated. A significant portion of the airflow is discharged through the bypass duct 13 generating a corresponding portion of the engine thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 generating the remainder of the engine thrust.

The intake fan 12 comprises an array of radially extending fan blades 40 that are mounted to the shaft 26. The shaft 26 may be considered a hub at the position where the fan blades 40 are mounted. FIG. 4 shows that the fan 12 is surrounded by a fan containment system 400 that also forms one wall or a part of the bypass duct 13.

In the present application a forward direction (indicated by arrow F in FIG. 4) and a rearward direction (indicated by arrow R in FIG. 4) are defined in terms of axial airflow through the engine 10.

Referring now to FIG. 5, the fan containment system 400 is shown in more detail. The fan containment system 400 comprises a fan case 450. The fan case 450 includes an annular casing element 452 that, in use, encircles the fan blades 40 of the gas turbine engine 10. The fan case 450 further includes a hook 454 that projects from the annular casing element in a generally radially inward direction. The hook 454 is positioned, in use, axially forward of the fan blades 40 and the hook is arranged so as to extend axially inwardly, such that in a fan blade off scenario the hook 454 prevents the fan blade from exiting the engine 10 through the air intake duct 11.

In the present embodiment, the hook 454 is substantially L-shaped and has a radial component extending radially inwards from the annular casing element 452 and an axial component extending axially rearwardly towards the fan blades 40 from the radial component.

Circumferential ribs 473, 474 and 476 are positioned around the annular casing element 452 on a radially outer surface for stiffening the fan case 450.

A fan track liner 456 is connected to the fan case 450 at the hook 454 via a connector. The connector biases the fan track liner to a position substantially aligned with the lower end of the hook 454 and permits movement of the fan track liner relative to the hook when a pre-determined force is applied to the fan track liner. In the present embodiment, the connector includes a plurality of circumferentially spaced fasteners 466 designed to shear/fracture at a predetermined load such that movement of the fan track liner radially outwards towards the annular casing element 452 is permitted when a load exerted on the fan track liner exceeds the predetermined level (in alternative embodiments an alternative fastening mechanism may be used e.g. a crushable collar or a sprung fastener).

The fan track liner is formed of a plurality of arcuate fan track liner panels positioned adjacent to each other such that an axis of each arcuate fan track liner is substantially co-axial so to form a substantially cylindrical (or in alternative embodiments a substantially frusto-conical) fan track liner.

The fan track liner 456 includes a tray 478 to which a filler layer 460 is connected (e.g. bonded). An attrition layer (or abradable layer) 458 is positioned, in use, proximal to the fan blades 40. In the present embodiments, a septum layer 462 is the interface between the attrition layer and the filler layer, forming part of the bond between the two. The septum layer 462 also separates the attrition layer and the filler layer and distributes any applied load between the attrition layer and the filler layer. The tray 478 is connected to the hook 454 via the fastener 466 so as to connect the fan track liner 456 to the fan case 450. The attrition layer 458 has a further rearward portion 464 that is constructed to provide increased ice impact resistance (e.g. to replace a more conventional GRP ice impact panel).

The fan track liner 456 is spaced radially inward from the annular casing element 452 so that a voidal region 480 is formed between the fan track liner 456 and the casing element 452.

A standoff 479 protrudes radially inwardly from the casing element 452. The standoff is positioned axially between a forward end of the fan track liner and a rearward end of the fan track liner. Each fan track liner panel is connected to the standoff via a fastener 481, e.g. a bolt. The fastener 481 is covered by the filler layer 460 and/or attrition layer 458 so that the fan track liner panels have a substantially smooth gas washed surface.

A support member 482 protrudes radially inwards from the annular casing element 452. In the present embodiment, the support member 482 is formed of a series of circumferentially spaced L-shaped protrusions, but in alternative embodiments the support member may extend fully around the annular casing element (i.e. with no interruptions/spacing). A rearward end of the fan track liner 456 is connected to the support member 482. In the present embodiment, the fan track liner 456 is connected to the support member via the tray and the attrition liner. The connection and manufacturing tolerances of the annular casing to the support member is such that any step between the fan track liner and adjacent panel (e.g. acoustic panel) will be out-of-flow (i.e. stepped radially outward) so as to improve aerodynamics. The fan track liner is connected to the support member using a fastener, but in alternative embodiments the fan track liner may be bonded to the support member.

The fasteners connecting the fan track liner to the hook 454, the standoff 479 and/or the support 482 may be spaced to be out of phase of the other connections (e.g. the sequence of fasteners connecting to the standoff is out of phase of the sequence of fasteners connecting to the hook). Additionally, or alternatively, the fasteners connecting the fan track liner to the hook, standoff or support may be circumferentially spaced by varying amounts. Arranging the fasteners in this way can break up the resonant frequency of the fan track liner panels to reduce the risk of a passing blade forcing a natural vibration of the fan track liner panels in the normal running range. Further, fan track liner panels can damp neighbouring fan track liner panels.

Figure 6:
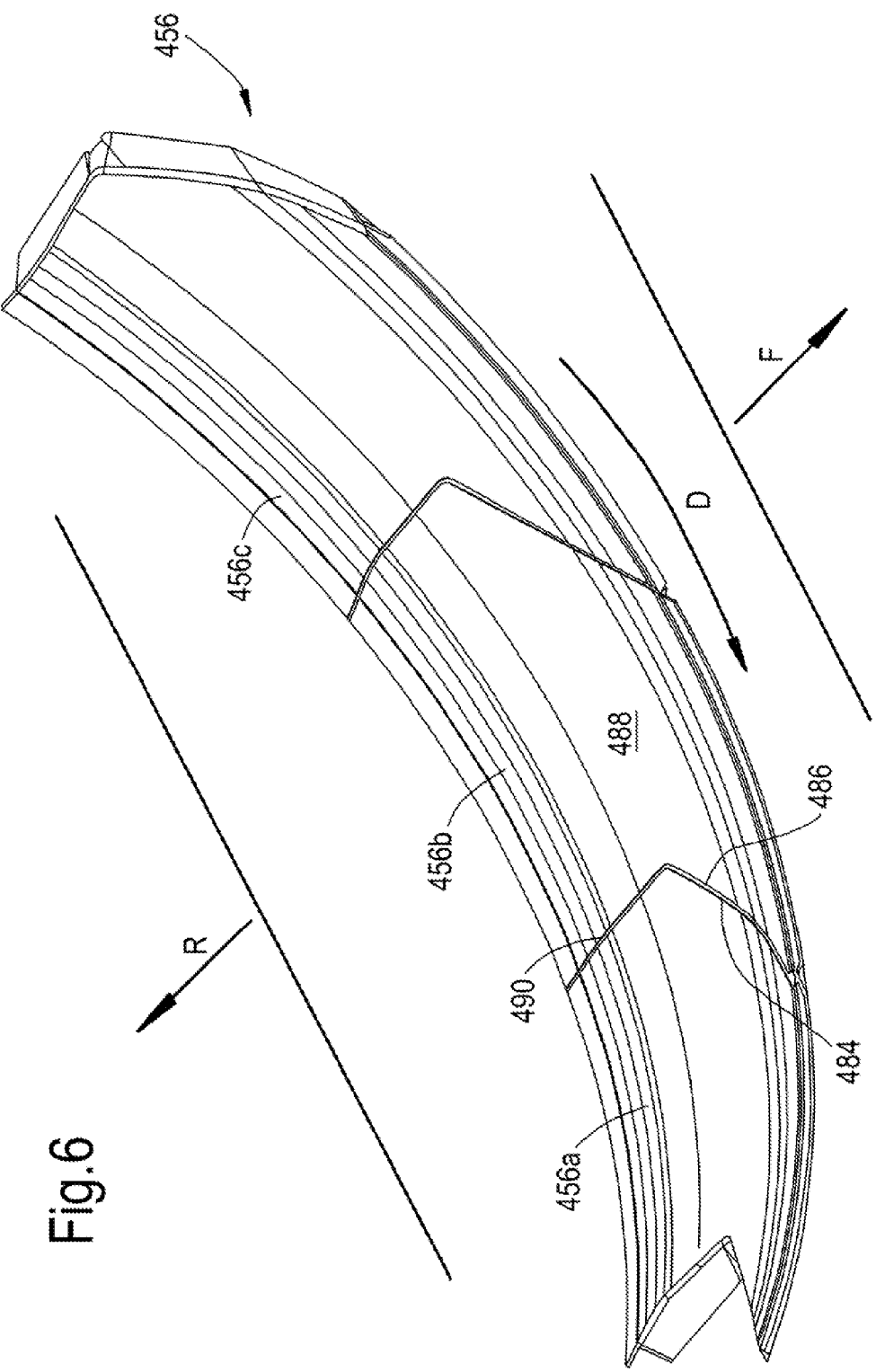
FIG. 6 is a perspective view from a forward end of three adjacent fan track liner panels of the fan containment system of FIG. 5.

Referring now to FIG. 6, the fan track liner panels 456a, 456b, 456c of the fan track liner 456 will be described in more detail. The arrow labelled D indicates the direction of rotation of the fan blades 40. Each fan track liner panel is shaped so that a forward portion of the axial edges 486, 484 of the gas washed surface 488 of the fan track liner panel are angled generally in the direction of rotation D of the fan blades 40. The specific angle of the fan track liner panel is also dependent upon the angle of twist of the blade tip, and the trajectory of the blade tip for a released fan blade. A rearward portion of the axial edges is substantially parallel with the axis of rotation of the fan blades 40. However, in alternative embodiments the rearward portion of the axial edges may be angled between (and including) 0 to 15° from an axis parallel to the axis of rotation of the fan for ease of assembly. In the present embodiment, the aforementioned rearward portion of the fan track liner panel is rearward of the standoff (not visible in FIGS. 6, but indicated at 479 in FIG. 5), and the aforementioned forward portion of the fan track liner panel is forward of the standoff.

The optimal shape of the fan track liner panel can be determined using techniques (e.g. modelling techniques) known in the art. The shape of the fan track liner panel is at least partly determined by the trajectory of a released fan blade. However, the shape of the fan track liner panel may also be determined by the natural resonance of the fan track liner panel and the pressure profile that results during operation of the fan. The pressure profile may also be used to determine the ideal circumferential length of each fan track liner panel.

If a fan blade (or part of a fan blade) is released from the remainder of the fan, the released fan blade will impact one of the fan track liner panels 456a, 456b, or 456c which substantially limits travel of the fan blade 40. The fan blade 40 moves forwards in an axial direction and as the fan blade 40 moves forward the attrition layer 458 is abraded and the filler layer 460 is compressed to absorb energy from the fan blade and slow down the speed of travel of the fan blade. Impact of the fan blade 40 with the fan track liner panel 456a, 456b, or 456c also causes the fastener 466 to fail permitting the fan track liner panel to pivot about the standoff 479 into the voidal region 480. Movement of the fan track liner, abrasion of the attrition layer and deformation of the filler layer means that when the released fan blade reaches the axial position of the hook 454, the released fan blade impacts the hook and is held by the hook 454 and further axially forward movement is prevented. A trailing blade then forces the held released blade rearwards where the released blade is contained.

The forward portion of the edges 484 and 486 are angled so as to be substantially similar to the most probable trajectory of the released fan blade. This alleviates the possible need of the released fan blade to activate a trap door of an adjacent fan track liner panel, and therefore mitigates the risk of a fan blade not being contained by the fan containment system.

Figure 7:
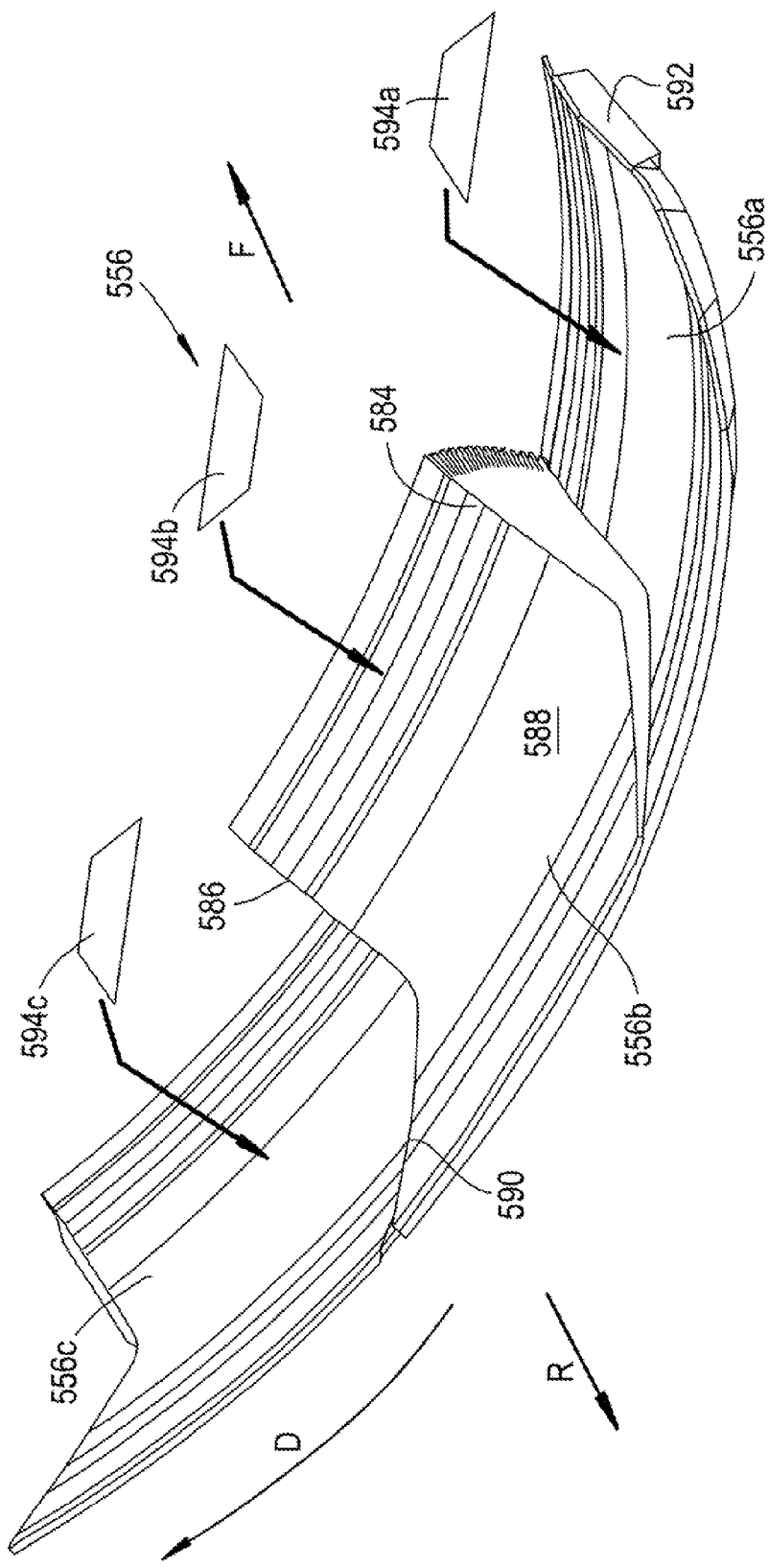
FIG. 7 is a perspective view from a rearward end of an alternative set of three adjacent fan track liner panels, with the cross section of a portion of the fan track liner panels illustrated.

Referring now to FIG. 7, an alternative fan track liner 556 is illustrated. The fan track liner panel 556 is similar to the fan track liner panel 456 and only the differences will be described here. Similar features are given similar reference numerals with a prefix "5" instead of a prefix "4".

The forward portion of the fan track liner panels 556a, 556b, 556c include axial sides 592 that are angled outwardly in a radial direction such that the forward portion of the fan track liner panel has a substantially trapezoidal cross section 594a, 594b and 594c. The cross section 594b of the fan track liner panel 556b positioned between fan track liner panels 594a and 594c is inverted compared to the cross sections 594a and 594b of the fan track liner panels 594a and 594c for ease of assembly.

The cross sections 594a, 594b, 594c of the fan track liner panels 556a, 556b and 556c means that when panel 594a or 594b experiences a force sufficient to pivot the fan track liner panel 556a or 556b, the panels apply an initial force to the adjacent fan track liner panel to encourage the trap door of a neighbouring fan track liner panel to activate if a fan blade crosses the boundary between the two fan track liner panels. This may occur if the trajectory of a released fan blade or part of a fan blade is different to the most probable trajectory.

Furthermore, the cross section of the forward portion further eases manufacture of the fan track liner panel 556 because the fan track liner panels can be "seated" on each other.

Advantageously, the described fan containment system reduces the risk of non-containment of a fan blade. Furthermore, vibration of the fan track liner panels can be reduced by optimising the shape of the liners to damp adjacent panels and to avoid the resonant frequency of the fan track liner during normal operation of the fan.

It will be appreciated by one skilled in the art that, where technical features have been described in association with one embodiment, this does not preclude the combination or replacement with features from other embodiments where this is appropriate. Furthermore, equivalent modifications and variations will be apparent to those skilled in the art from this disclosure. Accordingly, the exemplary embodiments of the invention set forth above are considered to be illustrative and not limiting.

In the present embodiment the filler layer of the fan track liner is an aluminium honeycomb structure, but in alternative embodiments an alternative filler layer may be used (e.g. a foam (for example a metal or synthetic foam)) or a honeycomb structure made from a material other than aluminium (for example a meta-aramid material)). The filler layer of the described embodiment is formed of the same material in a radial direction. However, in alternative embodiments, the filler layer may be formed of one or more radial layers (e.g. sub-layers) connected together via a septum layer. The radial layers may be of different densities, so as to vary the properties of the filler layer in a radial direction.

In the described embodiment, the fan track liner panels are connected to the standoff, but in alternative embodiments the fan track liner panel may only be connected at the hook and rearward support. In such embodiments the fan track liner panel may include a hinged portion and/or the fan track liner may be bonded to the annular casing element in a rearward region.

Figure 8A:
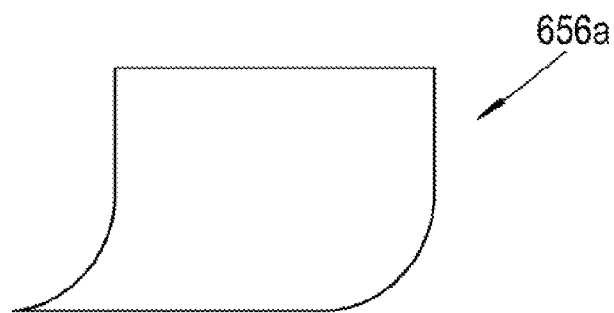
FIGS. 8A and 8B are a plan views of a gas washed surface of alternative fan track liner panels.
Figure 8B:
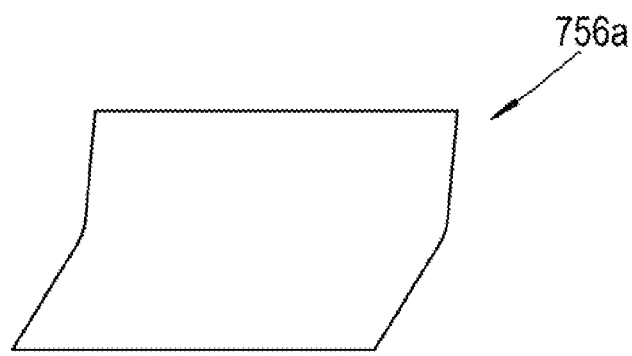

The shape of the fan track liner panel may be varied. For example, the forward portion may be curved instead of angled, as illustrated by fan track liner panel 656a in FIG. 8A. Alternatively the transition between the forward portion and the rearward portion may be more curved than that shown in the previously described embodiment and/or the rearward portion may be angled between 0 and 15° to the axis of rotation of the fan as illustrated by fan track liner panel 756a in FIG. 8B. Further alternatives will be apparent to the person skilled in the art, for example the forward portion may have curved and angled axial edges.

Figure 9A:
FIGS. 9A to 9C illustrate alternative cross sectional profiles of a portion of the fan track liner panels having profiled surfaces on the axial sides.
Figure 9B:
Figure 9C:

In the described embodiment, the axial sides of each fan track liner include an angled surface to engage an angled surface of an adjacent fan track liner panel. However, in alternative embodiments, no profiling may be applied to the sides of the fan track liner panels. Further alternatively the sides may include curved surfaces or surfaces angled in a different arrangement to that shown in FIG. 7. For example, opposing axial sides of a fan track liner panel may include surfaces angled in the same direction, e.g. surfaces that are substantially parallel, as illustrated by the cross sections of fan track liner panels 894a, 894b in FIG. 9A; or a portion of the axial sides may include a curved surface as illustrated by the cross sections of fan track liner panels 994a, 994b, 1094a, 1094b in FIGS. 9B and 9C.

It will be further appreciated by a person skilled in the art that having axial sides with a surface that is angled or curved to initiate activation of an adjacent fan track liner panel can be beneficial for a wide variety of fan track liner panels, including fan track liner panels with a gas washed surface having axial edges substantially parallel to an axis of rotation of the fan.

The invention claimed is:

1. A fan containment system for fitment around an array of radially extending fan blades mounted on a hub in an axial gas turbine engine, the fan containment system comprising:
    a fan case having an annular casing element for encircling an array of fan blades and a hook projecting in a generally radially inward direction from the annular casing element and positioned axially forward of an array of fan blades when the fan containment system is fitted around said fan blades; and
    an annular fan track liner comprising a plurality of adjacent arcuate fan track liner panels, wherein
    each fan track liner panel is connected to the fan case at the hook via one or more fasteners configured to permit movement of the fan track liner panel relative to the hook such that the fan track liner panel is pivotable towards the annular casing element when a released fan blade impacts the fan track liner panel,
    at least a portion of each fan track liner panel is shaped so as to accommodate travel of a released fan blade having a trajectory that passes near a boundary between adjacent fan track liner panels, and
    at least a portion of an edge of each fan track liner panel is shaped to extend in an axially forward direction to a position circumferentially offset from an axially rearward position of said edge.

2. The fan containment system according to claim 1, wherein the offset is in a direction of rotation of fan blades around which, in use, the fan containment system is fitted around the array of radially extending fan blades mounted on the hub in the axial gas turbine engine.

3. The fan containment system according to claim 1, wherein at least a portion of an axial side of each fan track liner panel is angled or curved in a circumferential direction so as to accommodate travel of a released fan blade.

4. The fan containment system according to claim 1, wherein the portion of the fan track liner panel that is shaped so as to accommodate travel of a released fan blade having a trajectory that passes near a boundary between adjacent fan track liner panels, is a forward portion of the fan track liner panel proximal to the hook.

5. The fan containment system according to claim 4, wherein a rearward portion of the fan track liner panel has axial edges that are angled at 0 to 15° in a circumferential direction to an axis parallel to a longitudinal axis of the fan containment system.

6. The fan containment system according to claim 1, wherein a forward end of the fan track liner panel is connected to the annular casing via the hook, and a rearward end of the fan track liner panel is supported or connected to the annular casing at a rearward support.

7. The fan containment system according to claim 6, wherein the fan track liner panel is connected to the annular casing element at a position between the forward end and the rearward end of the fan track liner panel.

8. The fan containment system according to claim 7, wherein the fan track liner panel is connected to the annular casing element via fasteners in the region between the forward end and the rearward end, or at the rear support, and wherein the fasteners are spaced so as to break up the natural resonance of the fan track liner panels.

9. The fan containment system according to claim 7, wherein the fan track liner panel is connected to the annular casing element via fasteners in the region between the forward end and the rearward end, and at the rear support, and wherein the fasteners are circumferentially out of phase.

10. The fan containment system according to claim 7, wherein a forward portion of the fan track liner panel pivots substantially about the position of connection to the annular casing element between the forward and rearward end when a fan blade impacts the fan track liner panel.

11. The fan containment system according to claim 1, wherein adjacent sides of two or more of the plurality of adjacent panels engage such that movement of one fan track liner panel towards the annular casing element applies a force to an adjacent fan track liner panel in a direction towards the annular casing element.

12. A fan containment system for fitment around an array of radially extending fan blades mounted on a hub in an axial gas turbine engine, the fan containment system comprising:
   a fan case having an annular casing element for encircling an array of fan blades and a hook projecting in a generally radially inward direction from the annular casing element and positioned axially forward of an array of fan blades when the fan containment system is fitted around said fan blades; and
   an annular fan track liner comprising a plurality of adjacent arcuate fan track liner panels;
   wherein each fan track liner panel is connected to the fan case at the hook via one or more fasteners configured to permit movement of the fan track liner panel relative to the hook such that the fan track liner panel is pivotable towards the annular casing element when a released fan blade impacts the fan track liner panel; and
   wherein adjacent sides of two or more of the plurality of adjacent panels engage such that movement of one fan track liner panel towards the annular casing element applies a force to an adjacent fan track liner panel in a direction towards the annular casing element.

13. The fan containment system according to claim 12, wherein at least portion of each of the adjacent sides include a surface profiled in the radial direction.

14. The fan containment system according to claim 13, wherein at least a portion of one side of one panel is seated on an adjacent side of an adjacent panel.

15. The fan containment system according to claim 13, wherein at least a portion of each of the adjacent sides is curved or angled in a radial direction.

16. The fan containment system according to claim 12, wherein at least a portion of the axial sides of two or more of the fan track liner panels have a cross section that is substantially wedge shaped.

17. A fan containment system for fitment around an array of radially extending fan blades mounted on a hub in an axial gas turbine engine, the fan containment system comprising:
   a fan case having an annular casing element for encircling an array of fan blades and a hook projecting in a generally radially inward direction from the annular casing element and positioned axially forward of an array of fan blades when the fan containment system is fitted around said fan blades; and
   an annular fan track liner comprising a plurality of adjacent arcuate fan track liner panels;
   wherein each fan track liner panel is connected to the fan case so as to form a trap door arrangement, such that when a fan blade is released and impacts the fan track liner, the trap door is activated to guide said released fan blade towards the hook; and
   wherein at least a portion of the fan track liner panel is angled or curved in a circumferential direction so as to accommodate travel of a released fan blade.

* * * * *